US 6,708,138 B1

(12) United States Patent
Zhang et al.

(10) Patent No.: US 6,708,138 B1
(45) Date of Patent: Mar. 16, 2004

(54) MAINTENANCE-AND-CONTROL APPARATUS AND METHOD FOR COORDINATE AND SURFACE TEXTURE MEASURING DEVICE

(75) Inventors: Yuwu Zhang, Kawasaki (JP); Masayoshi Uneme, Yamatokoriyama (JP); Yasushi Fukaya, Niwa-gun (JP); Kazuo Yamazaki, 1500 7th St, #7-0, Sacramento, CA (US) 95814

(73) Assignees: Mitutoyo Corporation, Kawasaki (JP); Mori Seiki Co., Ltd., Yamatokoriyama; Okuma Corporation, Nagoya; Kazuo Yamazaki, Sacramento, CA (US)

( * ) Notice: Subject to any disclaimer, the term of this patent is extended or adjusted under 35 U.S.C. 154(b) by 0 days.

(21) Appl. No.: 09/529,901
(22) PCT Filed: Aug. 28, 1998
(86) PCT No.: PCT/JP98/03838
§ 371 (c)(1),
(2), (4) Date: Apr. 21, 2000
(87) PCT Pub. No.: WO00/12965
PCT Pub. Date: Mar. 9, 2000

(51) Int. Cl.[7] .............................. G06F 19/00
(52) U.S. Cl. ........................ 702/182; 702/184
(58) Field of Search ................. 702/182, 183, 702/184, 150, 152, 153, 155, 168; 33/503, 504, 505; 700/98, 163, 181, 182

(56) References Cited

U.S. PATENT DOCUMENTS 4,819,195 A * 4/1989 Bell et al. .................... 702/95
5,198,990 A * 3/1993 Farzan et al. ............... 702/168
5,224,047 A * 6/1993 Kitagawa et al. ........... 700/139
5,581,482 A  12/1996 Wiedenman et al. ....... 702/186
5,629,871 A * 5/1997 Love et al. .................... 702/34
5,953,687 A * 9/1999 Zink et al. ................... 702/168
5,970,431 A * 10/1999 He .............................. 702/152
5,970,437 A * 10/1999 Gorman et al. ............. 702/184
6,006,171 A * 12/1999 Vines et al. ................. 702/184
6,141,629 A * 10/2000 Yamamoto et al. ......... 702/187
6,161,079 A * 12/2000 Zink et al. ................... 702/168
6,223,137 B1 * 4/2001 McCay et al. .............. 702/184
6,370,454 B1 * 4/2002 Moore ........................... 701/29
6,401,056 B1 * 6/2002 Sirois ........................... 702/184
6,490,543 B1 * 12/2002 Jaw ............................. 702/184
2002/0022899 A1 * 2/2002 Deby .......................... 700/100
2003/0004656 A1 * 1/2003 Bjornson ....................... 702/34

FOREIGN PATENT DOCUMENTS

| JP | A-60-118336 | 6/1985 |
| JP | A-61-74738  | 4/1986 |
| JP | A-61-134279 | 6/1986 |
| JP | A-8-14876   | 1/1996 |

* cited by examiner

Primary Examiner—Patrick Assouad
(74) Attorney, Agent, or Firm—Oliff & Berridge, PLC

(57) ABSTRACT

Operating information of a measuring device is extracted through analysis of at least a part program to execute measurement or output of measurements. Information facilitating maintenance and control of the measuring device is automatically generated from the operating information history.

13 Claims, 21 Drawing Sheets

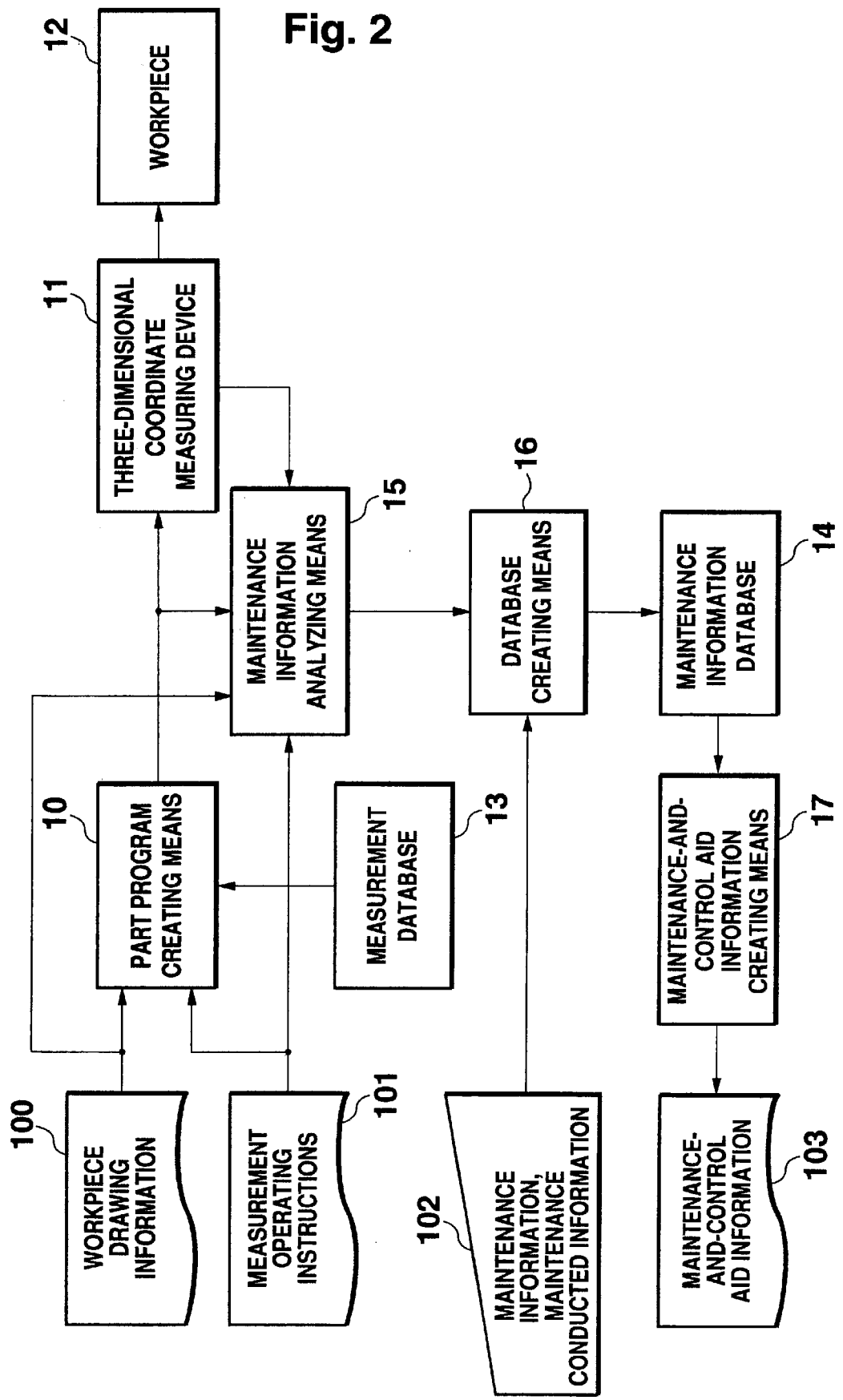

Fig. 3

MAINTENANCE CONDITION DATABASE

| No. | ELEMENT | ELEMENT NAME | MAINTENANCE INTERVAL | NOTICE INTERVAL | MAINTENANCE ITEM | MAINTENANCE LEVEL |
|---|---|---|---|---|---|---|
| c1 | X | X-AXIS GUIDE | 100Km | 90Km | GREASE FILLING | 1 |
| c2 | X | X-AXIS GUIDE | 500Km | 450Km | OVERHAUL | 2 |
| c3 | XM | X-AXIS MOTOR | 10000H | 9000H | BRUSH EXCHANGE | 1 |
| c4 | XM | X-AXIS MOTOR | 100000H | 90000H | MOTOR EXCHANGE | 2 |
| c5 | Y | ⋮ | ⋮ | ⋮ | ⋮ | ⋮ |
| ⋮ | ⋮ | ⋮ | ⋮ | ⋮ | ⋮ | ⋮ |
| c21 | P1 | PROBE 1 | 100000time | 90000time | OVERHAUL | 1 |
| c22 | P1 | PROBE 1 | 500000time | 450000time | MEASURING ELEMENT EXCHANGE | 2 |
| c23 | P1 | PROBE 1 | 1000000time | 900000time | PROBE EXCHANGE | 3 |
| ⋮ | ⋮ | ⋮ | ⋮ | ⋮ | ⋮ | ⋮ |

Fig. 4

MAINTENANCE HISTORY DATABASE

| No. | MAINTENANCE CONDITION | MAINTENANCE DATE/TIME | CUMULATIVE TOTAL AT MAINTENANCE |
|---|---|---|---|
| m1 | c1 | 1997.10.10.16:30 | 95Km |
| m2 | c5 | 1997.10.10.16:30 | 110Km |
| · · | · · | · · · · · · · | · · · · · · · |
|  |  |  |  |
|  |  |  |  |

Fig. 5

OPERATING HISTORY DATABASE

| No. | MEASUREMENT START DATE/TIME | MEASUREMENT END DATE/TIME | RUNNING TIME | X-AXIS MOVING DISTANCE | Y-AXIS MOVING DISTANCE | Z-AXIS MOVING DISTANCE | PROBE | | PROBE | | PROBE | |
|---|---|---|---|---|---|---|---|---|---|---|---|---|
| | | | | | | | TYPE | NUMBER OF MEASUREMENT TIMES | TYPE | NUMBER OF MEASUREMENT TIMES | TYPE | NUMBER OF MEASUREMENT TIMES |
| w1 | 1997.12.12.15:30 | 1997.12.12.16:30 | 1:00 | 1Km | 1.2Km | 0.3Km | p1 | 300 | | | | |

Fig. 6

MAINTENANCE-AND-CONTROL AID INFORMATION

| No. | ELEMENT | ELEMENT NAME | NOTICE INTERVAL | MAINTENANCE INTERVAL | MAINTENANCE ITEM | MAINTENANCE LEVEL | CUMULATIVE TOTAL OF THE RUNNING | MAINTENANCE NOTICE TIMING | MAINTENANCE TIMING |
|---|---|---|---|---|---|---|---|---|---|
| c1 | X | X-AXIS GUIDE | 400Km | 500Km | GREASE FILLING | 1 | 1450Km | 1400Km// | 1500Km |
| c2 | X | X-AXIS GUIDE | 4500Km | 5000Km | OVERHAUL | 2 | 1450Km | 4500Km | 5000Km |
| c3 | XM | X-AXIS MOTOR | 9000H | 10000H | BRUSH EXCHANGE | 1 | 290H | 9000H | 10000H |
| c4 | XM | X-AXIS MOTOR | 90000H | 100000H | MOTOR EXCHANGE | 2 | 290H | 90000H | 100000H |
| c5 | Y | ...... | ...... | ...... | ...... | ...... | | ...... | ...... |
| .. | .. | ...... | ...... | ...... | ...... | ...... | ...... | ...... | ...... |
| c21 | P1 | PROBE 1 | 90000time | 100000time | OVERHAUL | 1 | 3000time | 90000time | 100000time |
| c22 | P1 | PROBE 1 | 450000time | 500000time | MEASURING ELEMENT EXCHANGE | 2 | 3000time | 450000time | 500000time |
| c23 | P1 | PROBE 1 | 900000time | 1000000time | PROBE EXCHANGE | 3 | 3000time | 900000time | 1000000time |
| .. | .. | ...... | ...... | ...... | ...... | | | ...... | ...... |

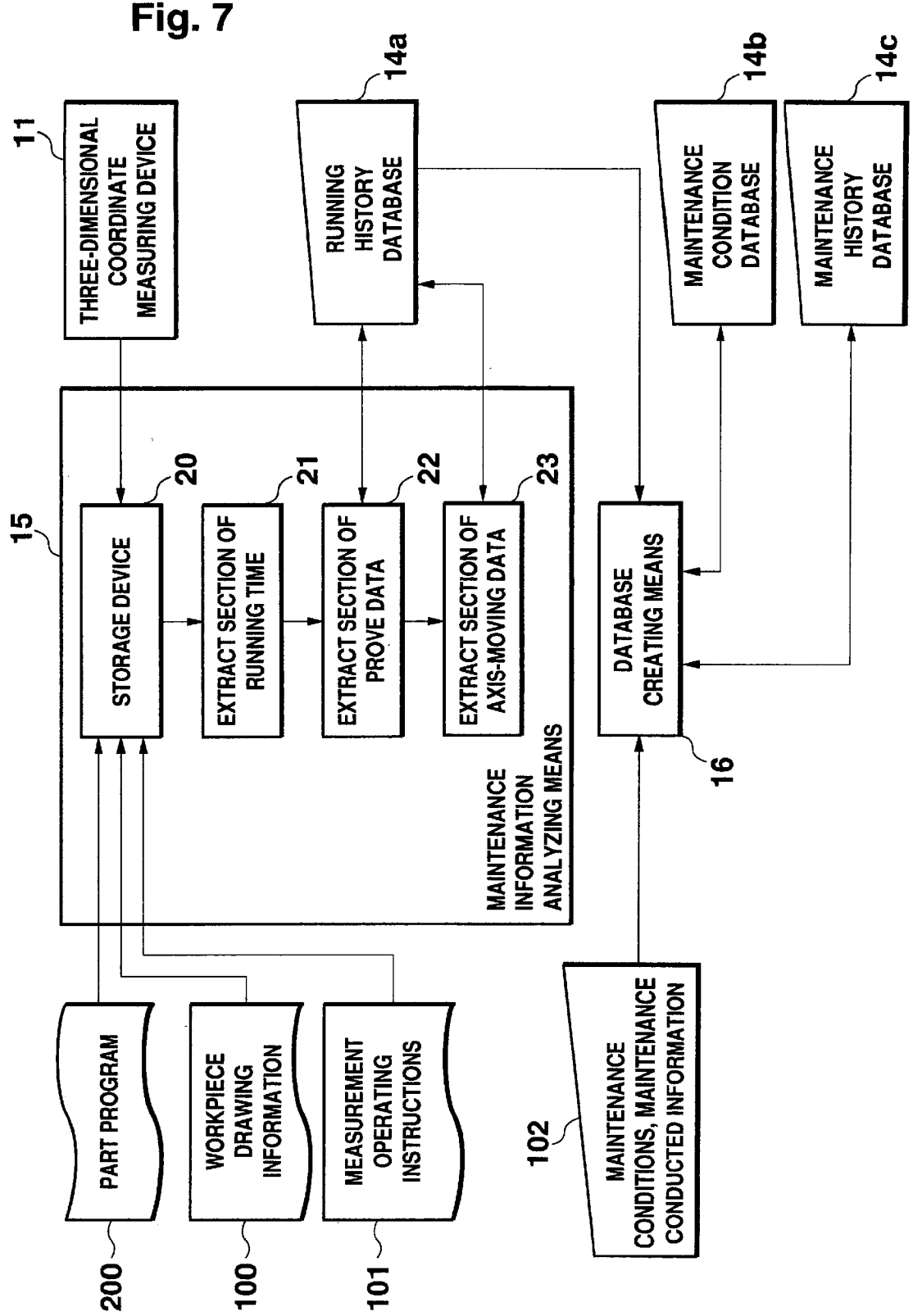

Fig. 10A
SAMPLE PROGRAM

| No. | PROGRAM | DESCRIPTION |
|---|---|---|
| 1 | DMISMN/'EXAMPLE_PROG1' | A NAME OF PROGRAM |
| 2 | FILNAM/'PROG_1' | A FILE NAME CONTAINING THE PROGRAM |
| 3 | WKPLAN/XYPLAN | MATCH X AND Y AXES OF COORDINATE SYSTEM TO X AND AXES. (IN YZ PLANE Y AXIS BECOMES X AXIS.) |
| 4 | UNITS/MM, ANGDEC | USE UNITS IN MM AND ANGLES IN DEGREE. |
| 5 | DECL/GLOBAL, REAL, X | |
| 6 | DECL/GLOBAL, REAL, Y | |
| 7 | DECL/GLOBAL, REAL, Z | DECLARE X, Y AND Z TO BE REAL VARIABLES. |
| 8 | M (ANY_CIRCLE)=MACRO/X1, Y1, Z1, R1, "ANYCR" | DEFINE MACRO. |
| 9 | X=ASSIGN/2*R1 | |
| 10 | F (ANYCR)=FEAT/CIRCLE, CART, X1, Y1, Z1, .0, .0, -1.0, X | DEFINE A CIRCLE (DEFINITION OF NOMINAL VALUES). |
| 11 | MEAS/CIRCLE, F (ANYCL), 4 | CREATE A CIRCLE BY MEASURING FOUR POINTS. |
| 12 | GOTO/X1, Y1, Z1 | MOVE TO X1, Y1 AND Z1. |
| 13 | X=ASSIGN/X1+R1-1.0 | |
| 14 | GOTO/X, Y1, Z1 | MOVE TO THE PROXIMITY OF GAGING POINT. |
| 15 | X=ASSIGN/X1+R1 | |
| 16 | PTMEAS/CART, X, Y1, Z1, 1.0, .0, .0 | MEASURE THE TARGET GAGING POINT. |
| 17 | Y=ASSIGN/Y1+R1-1.0 | |
| 18 | GOTO/X1, Y, Z1 | MOVE TO THE PROXIMITY OF THE NEXT GAGING POINT. |
| 19 | Y=ASSIGN/Y1+R1 | |
| 20 | PTMEAS/CART, X1, Y, Z1, .0, 1.0, .0 | MEASURE THE TARGET GAGING POINT. |
| 21 | X=ASSIGN/X1-R1+1.0 | |
| 22 | GOTO/X, Y1, Z1 | |
| 23 | X=ASSIGN/X1-R1 | |
| 24 | PTMEAS/CART, X, Y1, Z1, -1.0, .0, .0 | |
| 25 | Y=ASSIGN/Y1-R1+1.0 | |
| 26 | GOTO/X1, Y, Z1 | |
| 27 | Y=ASSIGN/Y1-R1 | |

Fig. 10B

| No. | PROGRAM | DESCRIPTION |
|---|---|---|
| 28 | PTMEAS/CART, X1, Y, Z1, .0, -1.0, .0 | |
| 29 | ENDMEAS | FINISH MEASUREMENT WITH THE COMPLETION OF MEASURING THE TARGET FOUR POINTS. |
| 30 | ENDMACRO | END OF MACRO. |
| 31 | SNSET/APPRCH, .125 | DETERMINE THE EXTENT OF APPROACH TO THE GAGING POINT WITH RAPID SPEED. |
| 32 | SNSET/SEARCH, .125 | DETERMINE THE EXTENT OF DISTANCE TO MOVE FOR MEASUREMENT FROM THE GAUGING POINT. |
| 33 | SNSET/RETRCT, .125 | DETERMINE THE EXTENT OF RETRACTING DISTANCE TO STOP AFTER MEASUREMENT. |
| 34 | S (1)=SNSDEF/PROBE, INDEX, POL, 2.0, .0, .0, .0, .0, -1.0, .157 | DEFINE A PROBE AND INPUT DISTANCE FROM PROBE ATTACHMENT POSITION TO PROBE POSITION. |
| 35 | SNSLCT/S (1) | ACKNOWLEDGE THE USE OF A PROBE 1 TO THE MACHINE. |
| 36 | MODE/MAN | SET THE MEASURING MACHINE TO MANUAL, MEASURE THE PREDETERMINED COORDINATE SYSTEMS (G54, G55), AND SAVE THE RESULTS AS WORX_CS_1, WORK_CS_2. AND PERFORM CALIBRATION OF THE PROBE. |
| 37 | T (1)=TOL/DIAM, -.01, .01 | INPUT UPPER AND LOWER TOLERANCE FOR VERIFYING THE DIAMETER OF THE CIRCLE (COMPARISON OF THE NOMINAL VALUES AND THE MEASURED VALUES). |
| 38 | DISPLAY/PRINT, DMIS, TERM, DMIS, STOR, DMIS | WRITE THE OUTPUT TO A PRINTER, A CRT, AND A FILE IN DMIS FORMAT. |
| 39 | FILNAM/'PROG1_OUT' | NAME OF THE OUTPUT FILE |
| 40 | PRCOMP/ON | CALCULATE THE CORRECT VALUES WITH THE DIAMETER OF THE PROVE COMPENSATED. |
| 41 | FEDRAT/POSVEL, PCENT, .75 | SET A MOVING VELOCITY. |
| 42 | FEDRAT/MESVEL, PCENT, .5 | SET A MEASURING VELOCITY. |
| 43 | THE MARK $$ INDICATES COMMENTS. | |
| 44 | RECALL/D (WORK_CS_1) | CALL A COORDINATE SYSTEM 1. |
| 45 | M (ANY_SLOT)=MACRO/X1, Y1, Z1, L, R1, "ANYSLOT_CR1", "ANYSLOT_CR2", & "1P0", "2P0", "3P0", "4P0" | DEFINE MACRO. |

Fig. 10C

| No. | PROGRAM | DESCRIPTION |
|-----|---------|-------------|
| 46 | X=ASSIGN/X1+L/2 | |
| 47 | Y=ASSIGN/2*R1 | |
| 48 | F (ANYSLOT_CR1)=FEAT/ CIRCLE, CART, X, Y1, Z1, .0, .0, -1.0, Y | |
| 49 | X=ASSIGN/X1-L/2 | |
| 50 | F (ANYSLOT_CR2)=FEAT/ CIRCLE, CART, X, Y1, Z1, .0, .0, -1.0, Y | DEFINE A CIRCLE (DEFINITION OF NOMINAL VALUES). |
| 51 | MEAS/CIRCLE, F (ANYSLOT_CR 1), 3 | CREATE A CIRCLE BY MEASURING THREE POINTS. |
| 52 | GOTO/X1, Y1, Z1 | MOVE TO X1, Y1 AND Z1. |
| 53 | X=ASSIGN/X1+L/2+R1* SIN (5) | |
| 54 | Y=ASSIGN/Y1+R1*COS (5) -0.1 | |
| 55 | GOTO/X, Y, Z1 | MOVE TO THE PROXIMITY OF GAUGING POINT. |
| 56 | Y=ASSIGN/X1+R1*COS (5) | |
| 57 | PTMEAS/CART, X, Y1, Z1, SIN (5), COS (5), .0 | MEASURE THE TARGET GAUGING POINT. |
| 58 | X=ASSIGN/X+L/2+R1-0.1 | |
| 59 | GOTO/X, Y1, Z1 | |
| 60 | X=ASSIGN/X+L/2+R1 | |
| 61 | PTMEAS/CART, X, Y1, Z1, 1.0, 0.0, .0 | MEASURE THE TARGET GAUGING POINT. MOVE TO THE PROXIMITY OF THE NEXT GAUGING POINT. |
| 62 | X=ASSIGN/X+L/2+R1*SIN (5) | |
| 63 | Y=ASSIGN/X1-R1*COS (5) +0.1 | |
| 64 | GOTO/X, Y, Z1 | |
| 65 | Y=ASSIGN/X1-R1*COS (5) | |
| 66 | PTMEAS/CART, X, Y, Z1, SIN (5), -COS (5), .0 | |
| 67 | ENDMEAS | |

Fig. 10D

| No. | PROGRAM | DESCRIPTION |
|---|---|---|
| 68 | X=ASSIGN/X1+0.9*L/2 | |
| 69 | Y=ASSIGN/Y1+R1-0.1 | |
| 70 | GOTO/X, Y, Z1 | |
| 71 | Y=ASSIGN/Y1+R1 | |
| 72 | F (1PO)=FEAT/POINT, CART. X, Y, Z1, .0, 1.0, .0 | |
| 73 | MEAS/POINT, F (1PO), 1 | |
| 74 | PTMEAS/CART, X, Y, Z1, .0, 1.0, .0 | |
| 75 | ENDMEAS | |
| 76 | X=ASSIGN/X1+0.9*L/2 | |
| 77 | Y=ASSIGN/Y1-R1+0.1 | |
| 78 | GOTO/X, Y, Z1 | |
| 79 | Y=ASSIGN/Y1-R1 | |
| 80 | F (2PO)=FEAT/POINT, CART, X, Y, Z1, .0, -1.0, .0 | |
| 81 | MEAS/POINT, F (2PO), 1 | |
| 82 | PTMEAS/CART, X, Y, Z1, .0, -1.0, .0 | |
| 83 | ENDMEAS | |
| 84 | X=ASSIGN/X1-0.9*L/2 | |
| 85 | Y=ASSIGN/Y1-R1+0.1 | |
| 86 | GOTO/X, Y, Z1 | |
| 87 | Y=ASSIGN/Y1-R1 | |
| 88 | F (3PO)=FEAT/POINT, CART, X, Y, Z1, .0, -1.0, .0 | |
| 89 | MEAS/POINT, F (3PO), 1 | |
| 90 | PTMEAS/CART, X, Y, Z1, .0, -1.0, .0 | |
| 91 | ENDMEAS | |
| 92 | Y=ASSIGN/Y1+R1-0.1 | |
| 93 | GOTO/X, Y, Z1 | |
| 94 | Y=ASSIGN/Y1+RI | |

Fig. 10E

| No. | PROGRAM | DESCRIPTION |
|---|---|---|
| 95 | F (4PO)=FEAT/POINT, CART, X, Y, Z1, .0, 1.0, .0 | |
| 96 | MEAS/POINT, F (4PO), 1 | |
| 97 | PTMEAS/CART, X, Y, Z1, .0, 1.0, .0 | |
| 98 | ENDMEAS | |
| 99 | MEAS/CIRCLE, F (ANYSLOT_CR 2), 3 | CREATE A CIRCLE BY MEASURING THREE POINTS. |
| 100 | GOTO/X1, Y1, Z1 | MOVE TO X1, Y1 AND Z1. |
| 101 | X=ASSIGN/X1-L/2+R1*SIN (5) | |
| 102 | Y=ASSIGN/Y1+R1*COS (5) -0.1 | |
| 103 | GOTO/X, Y, Z1 | MOVE TO THE PROXIMITY OF GAUGING POINT. |
| 104 | Y=ASSIGN/X1+R1*COS (5) | MEASURE THE TARGET GAUGING POINT. |
| 105 | PTMEAS/CART, X, Y1, Z1, SIN (5), COS (5), .0 | |
| 106 | X=ASSIGN/X-L/2+R1-0.1 | |
| 107 | GOTO/X, Y1, Z1 | |
| 108 | X=ASSIGN/X-L/2+R1 | |
| 109 | PTMEAS/CART, X, Y1, Z1, 1.0, 0.0, .0 | MEASURE THE TARGET GAUGING POINT. MOVE TO THE PROXIMITY OF THE NEXT GAUGING POINT. |
| 110 | X=ASSIGN/X-L/2+R1*SIN (5) | |
| 111 | Y=ASSIGN/X1+R1*COS (5) +0.1 | |
| 112 | GOTO/X, Y, Z1 | |
| 113 | Y=ASSIGN/X1-R1*COS (5) | |
| 114 | PTMEAS/CART, X, Y, Z1, SIN (5), -COS (5), .0 | |
| 115 | ENDMEAS | |
| 116 | GOTO/.0, .0, 5.0 | |
| 117 | ENDMACRO | |
| 118 | GOT0/70.0, -50.0, 5.0 | MOVE TO THE POSITION ABOVE THE FIRST CIRCLE TO MEASURE THE FOUR CIRCLES. |

Fig. 10F

| No. | PROGRAM | DESCRIPTION |
|---|---|---|
| 119 | CALL/M (ANY_CIRCLE), 70.0, -50.0, -12.5, (1CR), 10 | DEFINE AND MEASURE THE FIRST CIRCLE, AND INPUT THE RESULTS TO FA (1CR). |
| 120 | GOTO/70.0, -50.0, 5.0 | MOVE TO THE POSITION ABOVE THE FIRST CIRCLE. |
| 121 | GOTO/70.0, 50.0, 5.0 | |
| 122 | CALL/M (ANY_CIRCLE), 70.0, 50.0, -12.5, (2CR), 10 | DEFINE AND MEASURE THE SECOND CIRCLE, AND INPUT THE RESULTS TO FA (1CR). |
| 123 | GOTO/70.0, 50.0, 5.0 | |
| 124 | GOTO/-70.0, 50.0, 5.0 | |
| 125 | CALL/H (ANY_CIRCLE), -70.0, 50.0, -12.5, (3CR) | |
| 126 | GOTO/-70.0, 50.0, 5.0 | |
| 127 | GOTO/-70.0, 50.0, 5.0 | |
| 128 | CALL/M (ANY_CIRCLE), -70.0, -50.0, -12.5, (4CR) | |
| 129 | GOTO/-70.0, -50.0, 5.0 | |
| 130 | CALL/M (ANY_SLOT), .0, .0, .0, 60.0, 20.0, "ANYSLOT_CR1", "ANYSLOT_CR2", & "1PO", "2PO", "3PO", "4PO" | MEASURE A SLOT. |
| 131 | RECALL/D (WORK_CS_2) | CALL THE PREDETERMINED COORDINATE SYSTEM 2 TO MEASURE LATERAL FACES. |
| 132 | GOTO/.0, 40.0, 5.0 | |
| 133 | CALL/M (ANY_CIRCLE),. 0, 40.0, -10.0, (51CR) | DEFINE AND MEASURE THE FIRST CIRCLE OF THE TWO CIRCLES. |
| 134 | GOTO/.0, 40.0, 5.0 | |
| 135 | GOTO/.0, -40.0, 5.0 | |
| 136 | CALL/M (ANY_CIRCLE),. 0, -40.0, -10.0, (52CR) | |
| 137 | GOTO/.0, -40.0, 5.0 | |
| 138 | EVAL/FA (1CR), FA (2CR), FA (3CR), FA (4CR), T (1) | VERIFY THE DIAMETER OF THE INITIALLY MEASURED FOUR CIRCLES. |
| 139 | OUTPUT/F(1CR), F (2CR), F (3CR), F (4CR), T (1) | OUTPUT THE NOMINAL VALUES AND THEIR TOLERANCES OF THE FOUR CIRCLES. |
| 140 | OUTPUT/FA (1CR), FA (2CR), FA (3CR), FA (4CR), TA (1) | OUTPUT THE MEASURED VALUES AND VERIFIED RESULTS OF THE FOUR CIRCLES. |
| 141 | ENDFIL | END OF THE PROGRAM. |

US 6,708,138 B1

MAINTENANCE-AND-CONTROL APPARATUS AND METHOD FOR COORDINATE AND SURFACE TEXTURE MEASURING DEVICE

TECHNICAL FIELD

The present invention relates to a maintenance-and-control apparatus of a device for coordinate and surface texture measurement, and more particularly to a maintenance-and-control aid apparatus wherein operating information of a measuring device is extracted through analyzing a part program of measurement and output of measurements, and wherein aid information relating to maintenance and control of the measuring device is generated from a history of the operating information.

BACKGROUND ART

A three-dimensional coordinate measuring device as is commonly used to measure and evaluate dimensions and shapes of a workpiece, can also be used for measuring and evaluating surface roughness of the workpiece by exchanging a measuring probe of the device. Three-dimensional coordinate measuring devices are extensively used in a wide variety of industries because a diverse array of measuring probes, such as a touch trigger sensor, camera, or laser sensor, may be attached.

Three-dimensional coordinate measuring devices are precise mechatronic devices. For this reason, effective maintenance and control is essential to maintain accuracy and efficiency of measurements of three-dimensional coordinate devices.

Periodic inspection and repair by a serviceperson is usually adopted as the method for maintaining and control of a three-dimensional coordinate measuring device. With today's devices, the serviceperson can not keep track of the detailed operating history of the measuring device when performing inspection or repair. Therefore, they must use an array of inspection devices to ascertain the condition of the measuring device or identify the cause of functional deterioration, which leads to an increase in cost of maintenance and control.

The present invention aims to solve these conventional problems mentioned above. Accordingly, it is an object of the present invention to provide means for extracting operating information of a measuring device by analyzing a part program of measurement and output of measurement results, and generating aid information relating to maintenance and control for the measuring device from a history of the operating information.

DISCLOSURE OF THE INVENTION

The present invention attempts to solve the conventional problems described above and comprises of means or steps for analyzing operating status of a measuring device wherein a part program of measurement, output of a measurement result, or both are input, and operating information of the measuring device is extracted, and storage means or steps for storing said operating information.

The present invention may also be configured so as to comprise means or steps for analyzing operating status of a measuring device wherein a part program of measurement, or output of a measurement results, or both are input, and operating information related to each component of the measuring device is extracted; and storage means or steps for storing said operating information.

The present invention may also include means or steps for generating maintenance-and-control aid information for a measuring device wherein maintenance-and-control aid information is generated from the history of operating information stored in said storage means.

Furthermore, the present invention may comprise means or steps for analyzing operating status of the measuring device wherein a part program of measurement, output of a measurement result, or both are input and operating information of the measuring device is extracted for each component, and database converting means or steps for converting said operating information for each component to a database for storing said maintenance-and-control aid information for the measuring device.

As described above, a three-dimensional coordinate measuring system according to the present invention extracts operating information for each component of a measuring device through analysis of a part program of measurement and output of a measurement result and stores them to construct a database of operating history of the measurement device. A serviceperson can therefore readily understand details of the operating history of the measurement device and easily acquire information assisting inspection of the measuring device for operating state or functional deterioration.

The present invention is also capable of organically using a maintenance information database and an operating history database of a measuring device wherein the operating information of each component of the measuring device is extracted and registered through analysis of the part program of measurement and the output of measurement. In this way as well, it is possible to aid high-level maintenance and control to monitor and estimate the state of the measuring device and to analyze the cause of functional deterioration or failure.

Maintenance and control of the three-dimensional coordinate measuring device is made more effective and economical. The sore operating history data and maintenance information of the measuring device can also be utilized as design aid information through feedback of the registered data to the measuring device design process.

BRIEF DESCRIPTION OF DRAWINGS

FIG. 2 shows a general configuration of a three-dimensional coordinate measuring system embodying a maintenance-and-control aid apparatus of the present invention;

FIG. 3 is an example of a maintenance condition database;

FIG. 4 is an example of a maintenance history database;

FIG. 5 is an example of a operating history database;

FIG. 6 is an example of maintenance-and-control aid information;

FIG. 7 shows a measuring information analyzing means;

FIGS. 10A, 10B, 10C, 10D, 10E, and 10F show a sample of a part program;

BEST MODE FOR CARRYING OUT THE INVENTION

1. Configuration of a Common System

Figure 1:
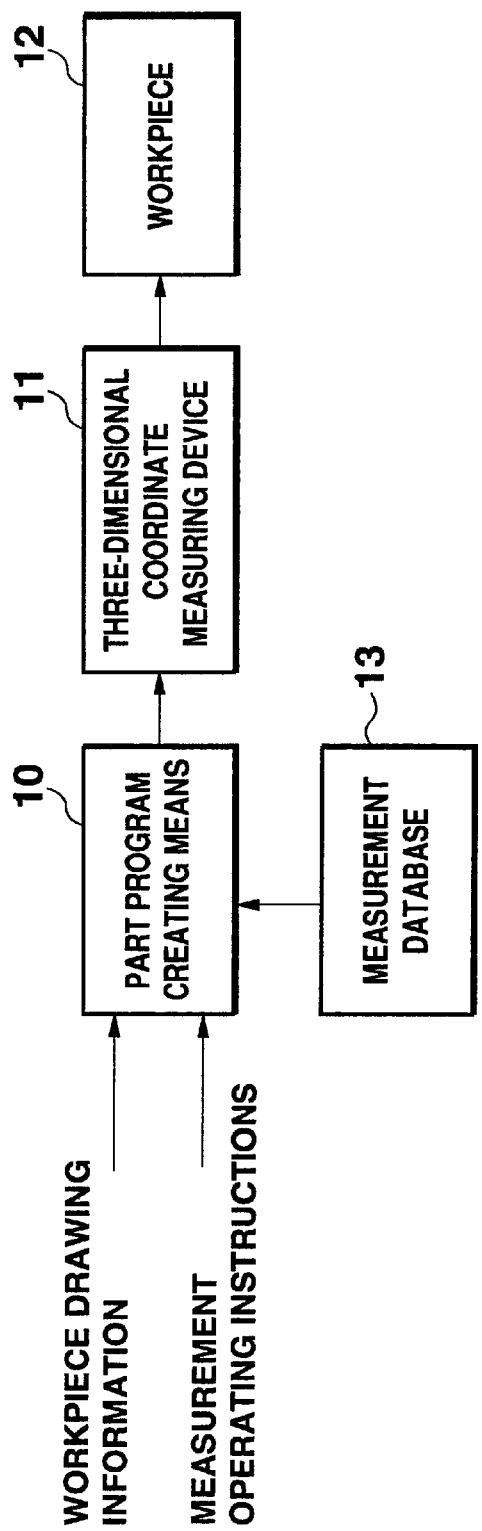
FIG. 1 shows a general configuration of a typical conventional system for three-dimensional coordinate measurement.

As depicted in FIG. 1, a part program creating means 10 creates a part program based on drawing information concerning the position, shape, and roughness of a workpiece and information of measurement operating instructions concerning where and how to measure the workpiece. The part program creating method includes online programming in which an operator indicates measuring procedures through controlling a three-dimensional coordinate measuring device 11 on a console panel and offline programming in which measuring procedures are indicated through the use of electronic drawing information, such as CAD data of a workpiece 12, without actuating the three-dimensional coordinate measuring device 11. In either case, the part program is generated based on consultation with measurement database 13 holding data for specifications of a measuring device and a probe, general tolerance conditions, and experiences in measurement.

The generated part program is finally checked on the three-dimensional coordinate machine 11 in the testing run and, when found acceptable, it is used on measurement in the productive run.

An operator updates a log of operating history of the three-dimensional coordinate measuring device in an operating log or the like every time he/she conducts measurement, and the next maintenance is usually scheduled based on the log. However, the actual three-dimensional coordinate measuring device 11 comprises a variety of elements including a touch trigger probe, slider on each axis and motor, and the like and has a precise and complicated structure. For example, the brushes of a direct-current motor should be exchanged every tens of thousands of operating time but it is difficult to obtain the real net operating time of each axis from the records of the above-mentioned operating log. The actual state is that maintenance is conducted using very rough guidelines such that part maintenance is scheduled based on overall operating time, or maintenance is conducted periodically, such as annually.

As a result, situations such that the measuring device continues to run past the maintenance term without maintenance, or that unnecessary maintenance is conducted, occur and lead to problems of a measuring device malfunction or unnecessary maintenance costs.

2. General Configuration

An embodiment of the present invention will be described below with respect to a three-dimensional coordinate measuring device. However, it is also possible to embody the present invention in surface texture measuring devices such as surface roughness measuring devices, contour shape measuring devices, and roundness measurement instruments.

FIG. 2 shows a general configuration of a three-dimensional coordinate measuring system embodying a maintenance-and-control aid apparatus of the present invention in measurement of three-dimensional coordinates.

With this configuration, a part program is created after consulting a measurement database 13 and drawing information about a workpiece 100 and information about measurement operating instructions. Then, maintenance information is extracted by analyzing the contents of the part program. The extracted results stored in a maintenance information database 14 represent the operating history of a measuring device. Maintenance-and-control aid information 103 is constructed based on the maintenance information database 14. This allows maintenance to be properly scheduled and reduces malfunctions from occurring while eliminating unnecessary costs.

A maintenance information analyzing means 15 is a means for analyzing operating status of a measuring device wherein the operating status of a measuring device is extracted. The maintenance information analyzing means 15 analyzes the part program to find the number of measurement of a probe and the entire moving distance of each axis. Measurement start and end dates/times are input from the three-dimensional coordinate measuring device 11.

A database creating means 16 functions as a database converting means for compiling the operating information for each component of the measuring device into a database generating maintenance-and-control aid information for the measuring device. The database creating means 16 checks consistency in the internal information of the database, and updates a maintenance information database through input of data on maintenance conditions and maintenance conducted information 102.

A maintenance-and-control aid information creating means 17 functions as a means for generating maintenance-and-control aid information wherein maintenance-and-control aid information 103 for a measuring device is generated from a history of the operating information stored in said database 14. The maintenance-and-control aid information creating means 17 extracts information related to operating history, maintenance history, and maintenance notice or the like from the maintenance information database 14 and executes output to a printer or display, file creation, and so on. The maintenance information database 14 comprises a maintenance condition database, maintenance history database, and operating history database.

3. Maintenance Condition Database 102

FIG. 3 is an example maintenance condition database contained in a maintenance information database 14.

The maintenance condition database maintains essential data about each element of the measuring device requiring maintenance, maintenance interval thereof, details on maintenance. The maintenance condition database may comprise a unique data number, element such as a guide or probe, name of the element, maintenance interval, maintenance notice interval indicating when to start maintenance notice, maintenance item of each element, and maintenance level for each element.

The maintenance interval may designate that the x-axis guide, for example, requires lubrication every 100 km and the maintenance notice interval indicates that maintenance warning is begun 90 km after the previous maintenance.

Maintenance level for the x-axis guide, for example, may include a lubrication at level 1 and overhaul at level 2. When overhaul is conducted, lubrication is also executed, so that overhaul includes lubrication.

4. Maintenance History Database

FIG. 4 is an example maintenance history database contained in the maintenance information database 14. The maintenance history database may comprise a unique data number, number of the maintenance condition database, maintenance date/time, and cumulative total at maintenance.

The maintenance condition number (e.g. c1, c5) identifies the corresponding item in the maintenance condition database.

The cumulative total at maintenance is a cumulative total of operating time when maintenance is conducted, and, as a rule, represents the total opening time of the measuring device.

The maintenance history database shown in FIG. 4 comprises a number which refers to the maintenance condition database as a maintenance condition. This eliminates the need for retaining the same information as the maintenance condition database in the maintenance history database. As a result, it is possible to reduce required storage capacity in addition the simplification of data input. This is an example of a so-called relational database.

5. Operating History Database

FIG. 5 is an example operating history database contained in the maintenance information database 14.

The operating history database retains operating information of each element extracted by analyzing the part program. The operating history database may comprise a unique data number; measurement start date/time input from the three-dimensional coordinate measuring device; measurement end date/time input from the three-dimensional coordinate measuring device; operating time obtained by subtracting measurement start date/time from measurement end date/time; moving distance of x-axis, y-axis, and z-axis; type of a probe; and the number of measurement times.

In this example of the database, when a single part program is analyzed, a single record is generated. The configuration of this example supports a maximum of 3 types of exchangeable probes.

The types of the probes must match the elements registered in the maintenance condition database.

6. Maintenance-And-Control Aid Information

FIG. 6 shows an example printout of the maintenance-and-control aid information 103.

In this example, the cumulative operating total of a measuring device, starting time of maintenance notice, and next maintenance timing is included in the printout in addition to the contents of the maintenance condition database.

The cumulative total of the operating in this example is a general total of the operating from the start of the use of the measuring device rather, than from the point in time of previous maintenance.

Two slashes added to the data on maintenance notice timing in the record of the number c1 indicate that the cumulative total of the operating at this point exceeded the maintenance notice timing.

While for the sake of understanding, each database and data therein were described and explained as having a fixed format, it is also acceptable for the data to be in a free format. Although the maximum number of the probe types is, in this example, three in the operating history database, it is possible to increase or decrease a number of fields in a free-form database depending on how many probe types are used. This allows the amount of stored data to be reduced, but causes a structure of the database to be more complicated.

7. Maintenance Information Analyzing Means 15

FIG. 7 shows a detail of a maintenance information analyzing means and a database creating means 16.

In this example, a storage device 20 stores a part program 200, the drawing information of workpiece 100 of such as coordinate system, information about measurement operating instructions 101 of such as probes to be used, and information about the measuring device of such as measurement start date/time.

An extracting section of operating time 21 calculates operating time of a measuring device.

An extracting section of probe data 22 determines the total number of measurement times of point by a probe through analyzing the part program 200.

An extracting section of axis-moving data 23 determines an axis-by-axis total of operating distance through analysis of the part program 200.

The database creating means 16 ascertains whether or not the probe type in the operating history database 14a is registered in the maintenance condition database 14b, and, when the probe type is not registered, prompts an operator to register a maintenance condition or modify the probe number on an interactive bases. Thus, the database creating means 16 verifies and maintains consistency of information in each database in conjunction with adding and manual updating data of maintenance conditions and/or maintenance conducted information to the maintenance information database 14.

8. Maintenance-And-Control Aid Information Creating Means

Figure 8:
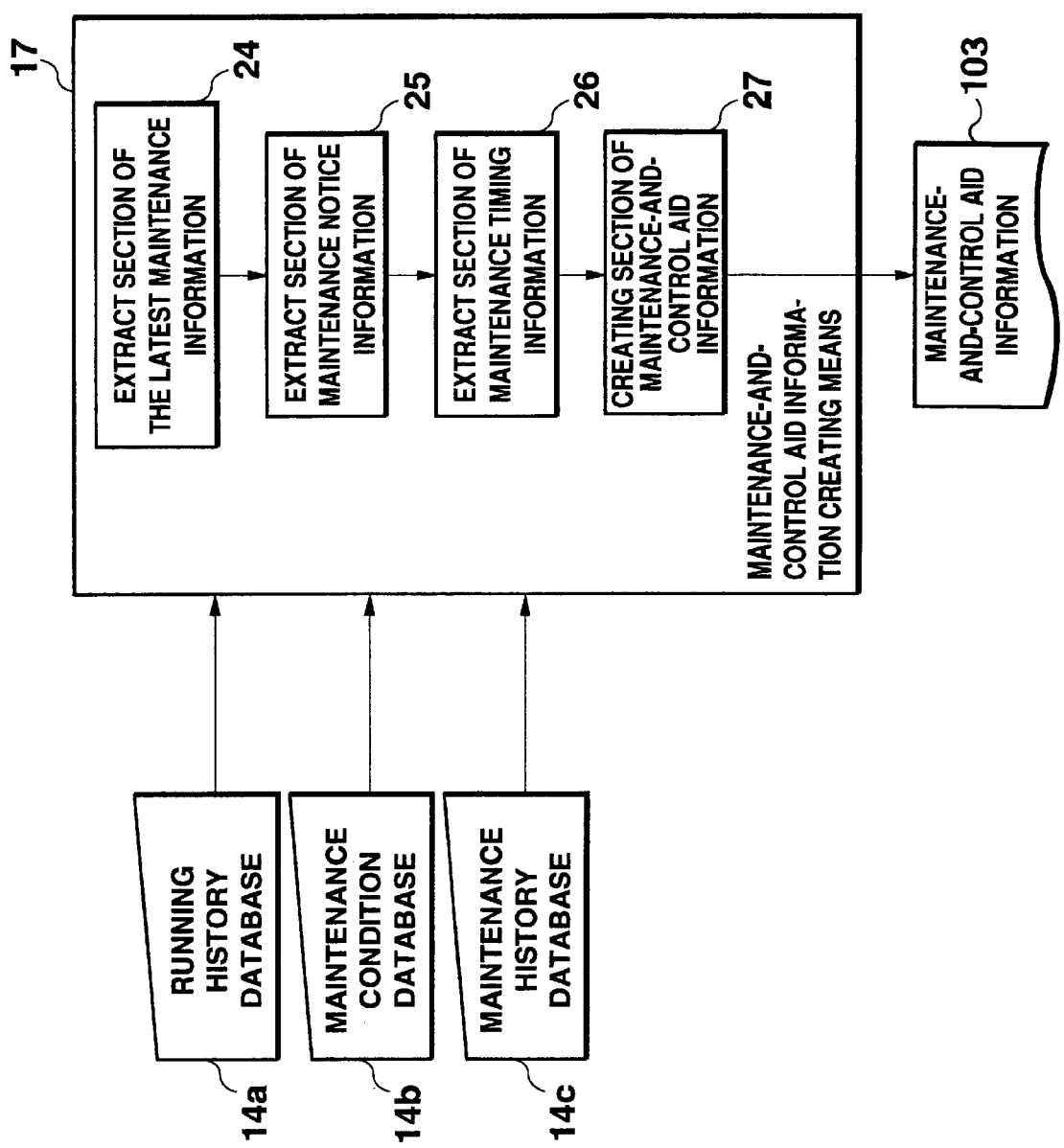
FIG. 8 shows a maintenance-and-control aid information creating means.

Referring now to FIG. 8 showing a detail of a maintenance-and-control aid information creating means 17, how an extracting section of the latest maintenance information 24 extracts the latest information by each of the elements of a measuring device will be described.

An extracting section of maintenance notice information 25 determines the cumulative total of the operating by accumulating each of the records in the operating history database 14a and extracts information about each element of the measuring device concerning whether or not the stage of requiring maintenance notice has arrived.

An extracting section of maintenance timing information 26 extracts information, for each element of the measuring device, as to whether or not a stage of requiring maintenance has arrived from the cumulative total of the operating time.

A creating section of maintenance-and-control aid information 27 summarizes said cumulative total of the operating, maintenance notice information, and maintenance information, outputs them to a printer and/or display, and creates a file.

9. Part Program

A specific process flow will be described below.

Figure 9:
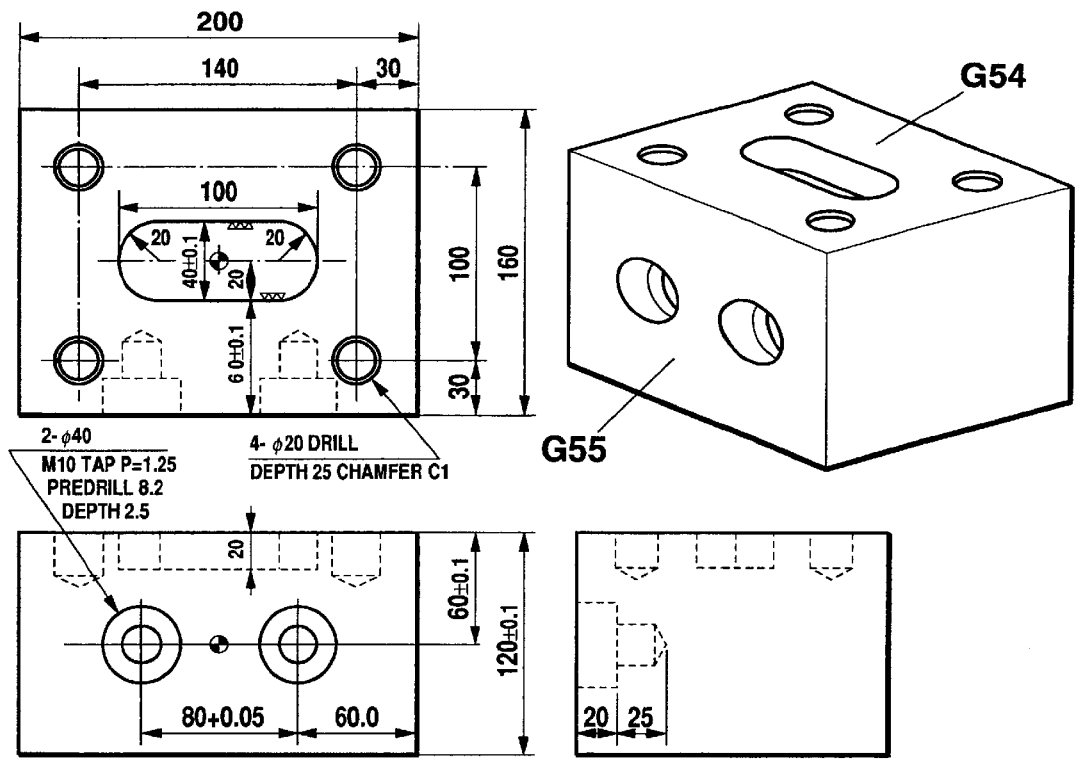
FIG. 9 shows an example of a workpiece.

FIG. 9 shows a workpiece measured by a part program of FIG. 10. The part program executes measurement of all 6 holes and one pocket processed on two faces of the workpiece.

Files and variables are declared and the measuring device is put in readiness from program No. (hereafter referred to as just No.) 1 to No. 7.

A macro to measure a circle is defined from No. 8 to No. 30 and measurement is set as 4-point measurement as shown in No. 11.

Probes are defined at No. 34 and selected at No.35.

Tolerances are defined at No. 37.

Velocity is specified at No. 41 and No.42.

A macro to measure a slot is defined from No. 45 to No. 117. The first semicircle portion of the slot is assumed to be a circle and measured by 3-point measurement at No. 51. The parallel lines in the central portion of the slot is measured by point measurement at 4 points in total of each one point at No.73, No.81, No.89, No.96. The second semicircle portion of the slot is assumed to be a circle and measured by 3-point measurement at No. 99.

Actual axis-moving operation for measurement is started in action from No. 118.

Circle measurement is conducted using the macro to measure a circle at 4 locations of No. 119, No. 122, No. 125, and No. 128, and then slot measurement through the macro is conducted at No. 130.

Two circles are measured using the macro to measure a circle at No. 133 and No. 136 after shifting a coordinate system at No. 131.

The circles initially measured at 4 locations are verified against the tolerances at No. 138.

10. Extracting section of Operating Time

When the maintenance information analyzing means shown in FIG. 7 begins to analyze the part program, a part program 200 is first read, and then drawing information of workpiece 100, measurement operating instructions and others such as measurement starting position of initial coordinate of each axis, are input. These are internally stored in the storage device 20.

Figure 11:
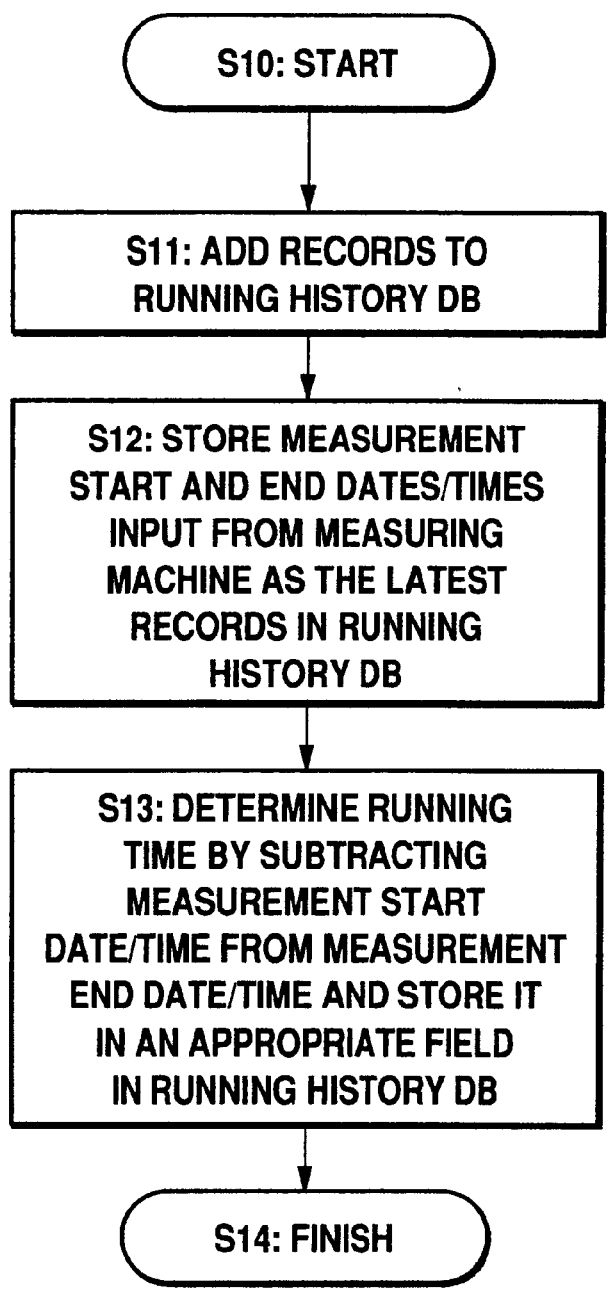
FIG. 11 shows process procedures in an operating time extracting section.

Subsequently, the extracting section of operating time 21 is invoked to execute the process shown in FIG. 11.

Details of the process is described below.

S10: Process of the extracting section of operating time 21 starts.

S11: New records are added to the operating history database 14a and all contents of the records are cleared.

S12: Measurement start date/time and measurement end date/time inputted from the measuring device are stored in appropriate fields of the new records added in the previous step in the operating history database 14a.

S13: Operating time is determined by subtracting the measurement start date/time from the measurement end date/time and stored in the operating history database 14a.

S14: Process of the extracting section of operating time 21 is terminated.

11. Extracting section of Probe Data

Figure 12:
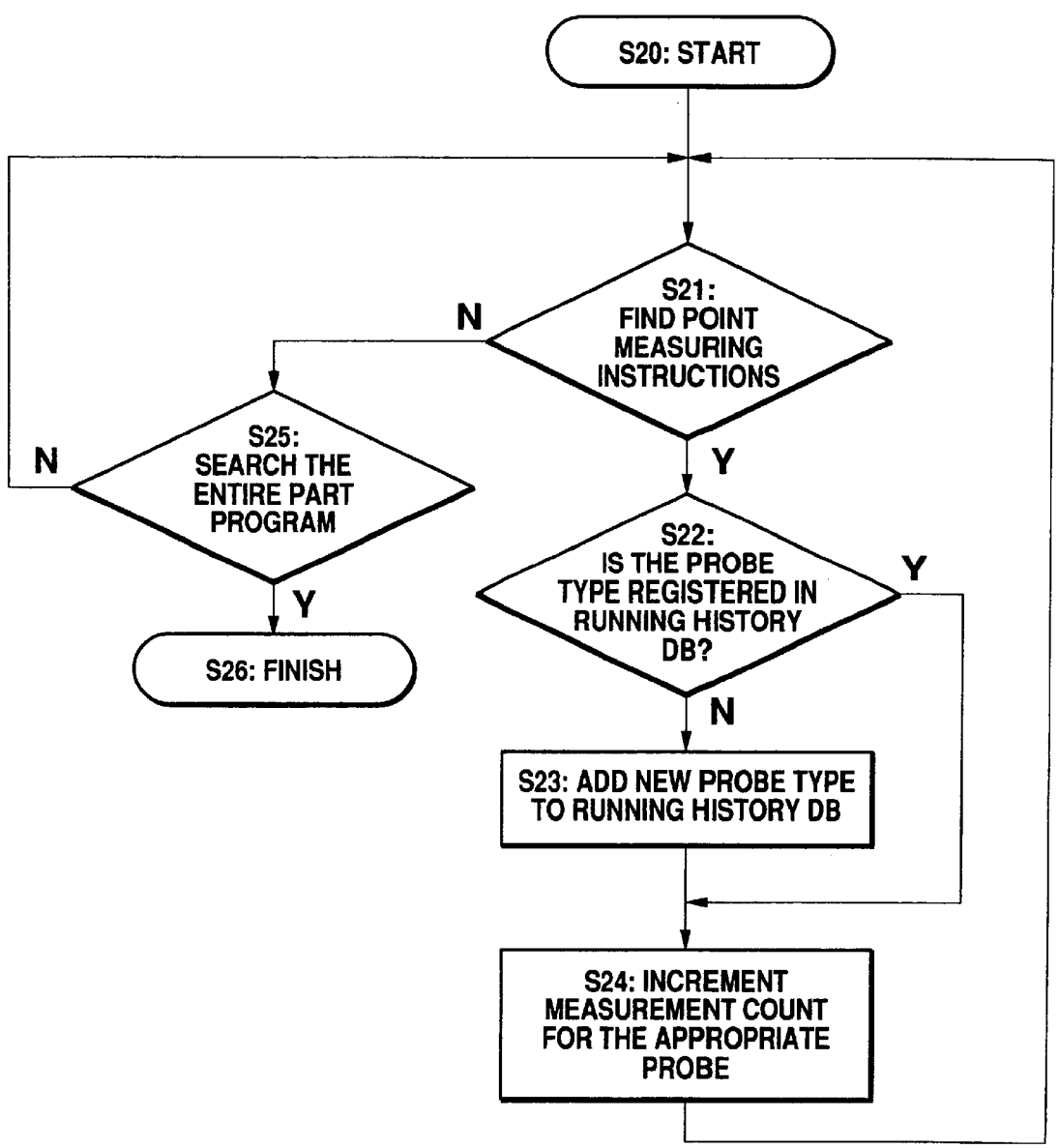
FIG. 12 shows process procedures in a probe data extracting section.

Next, the extracting section of probe data is invoked to start processing described in FIG. 12.

The extracting section of probe data executes the following process.

S20: Process of the extracting section of probe data 22 starts.

S21: Instructions on selecting a probe and measuring a point are searched for through the part program from the top.

The search must allow for the presence of a macro in the part program. To be more specific, when an argument is used in the macro or elsewhere, it is necessary to use the value passed when the macro is called, rather than the value defined in the macro.

Therefore, the search is performed in the same order as the part program is executed in the three-dimensional coordinate measuring device and the argument must be treated in a like manner. This should be applied to the search order in the subsequent examples, unless otherwise specified.

As a result of the search, the instruction for selecting a probe is found at No. 35 in the example of FIG. 10 and the label of the probe is indicated as "1". The macro to measure a circle is then called at No. 119, and the first point measurement to be detected at No. 16.

S22: The operating history database 14a is consulted to ascertain whether or not the probe detected in the previous step has been registered in the probe type.

S23: If the probe is not registered, it is newly registered in the probe type of the operating history database 14a. The label "1", in the example of FIG. 10 detected in the step S21 is stored in the probe type column.

S24: The number of measurement times of the corresponding probe is incremented (increased by 1).

S25: As described up to this point, the part program is searched to the end thoroughly so as to repeat processing.

S25: Process of the extracting section of probe data is terminated.

12. Extracting section of Axis-Moving data

Figure 13:
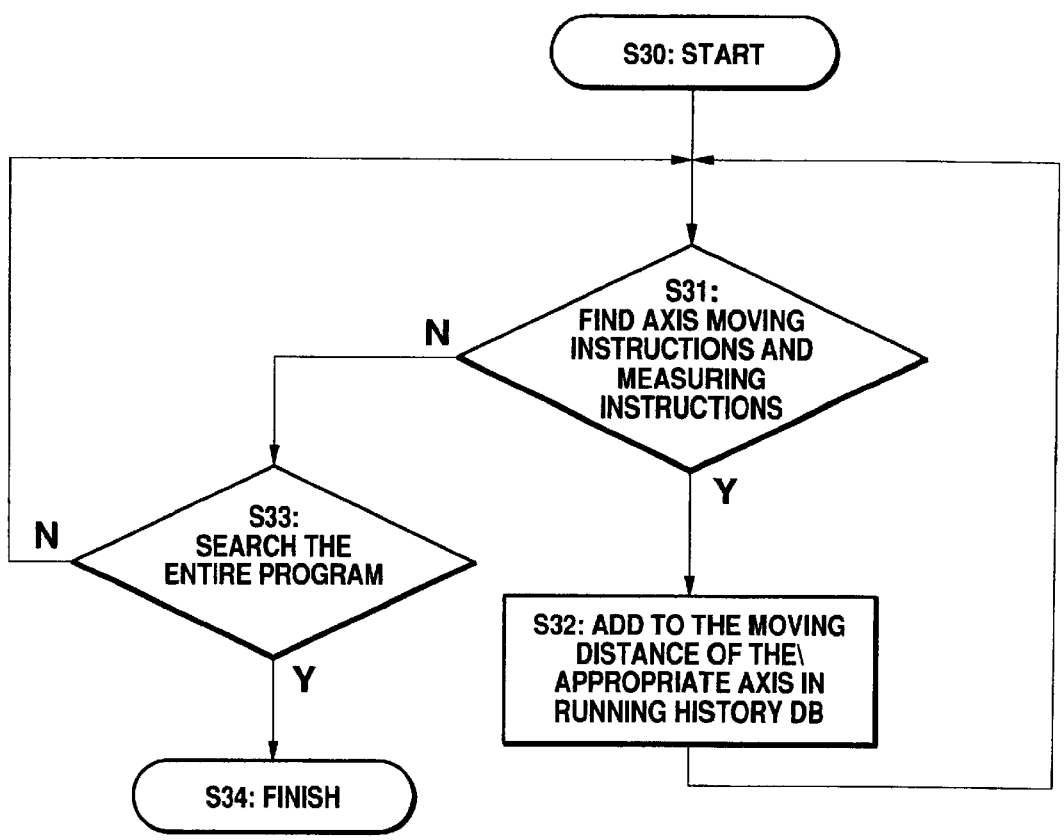
FIG. 13 shows process procedures in an axis-moving data extracting section.

Next, the extracting section of axis-moving data 23 is invoked to start processing described in FIG. 13. The extracting section of axis-moving data 23 executes the following process.

S30: Process of the extracting section of axis-moving data 23 starts.

S31: Axis moving instructions and measuring instructions are searched for from the top of the part program. Moving distance is determined and temporarily stored.

This causes the macro to measure a circle to be invoked at No. 119 in the example shown in FIG. 10 and, as a result, the first moving instruction is detected at No. 12. Although the instruction on moving coordinates X1, Y1, and Z1 are detected in this example, the values given as arguments when the macro is called, that is to say, the values specified at No. 119 (X1=70.0, Y1=−50.0, Z1=−12.5) are used as the values of the coordinates X1, Y1, and Z1.

S32: The operating distance is calculated from the difference between the current coordinate position of the measuring device and the target position of moving found at the previous step and the resulting value is added to the operating distance of the appropriate axis in the operating history database 14a.

S33: The process is repeated until the part program has been searched thoroughly to the end.

S34: Process of the extracting section of axis moving data is terminated.

13. Database Creating Means

Figure 14:
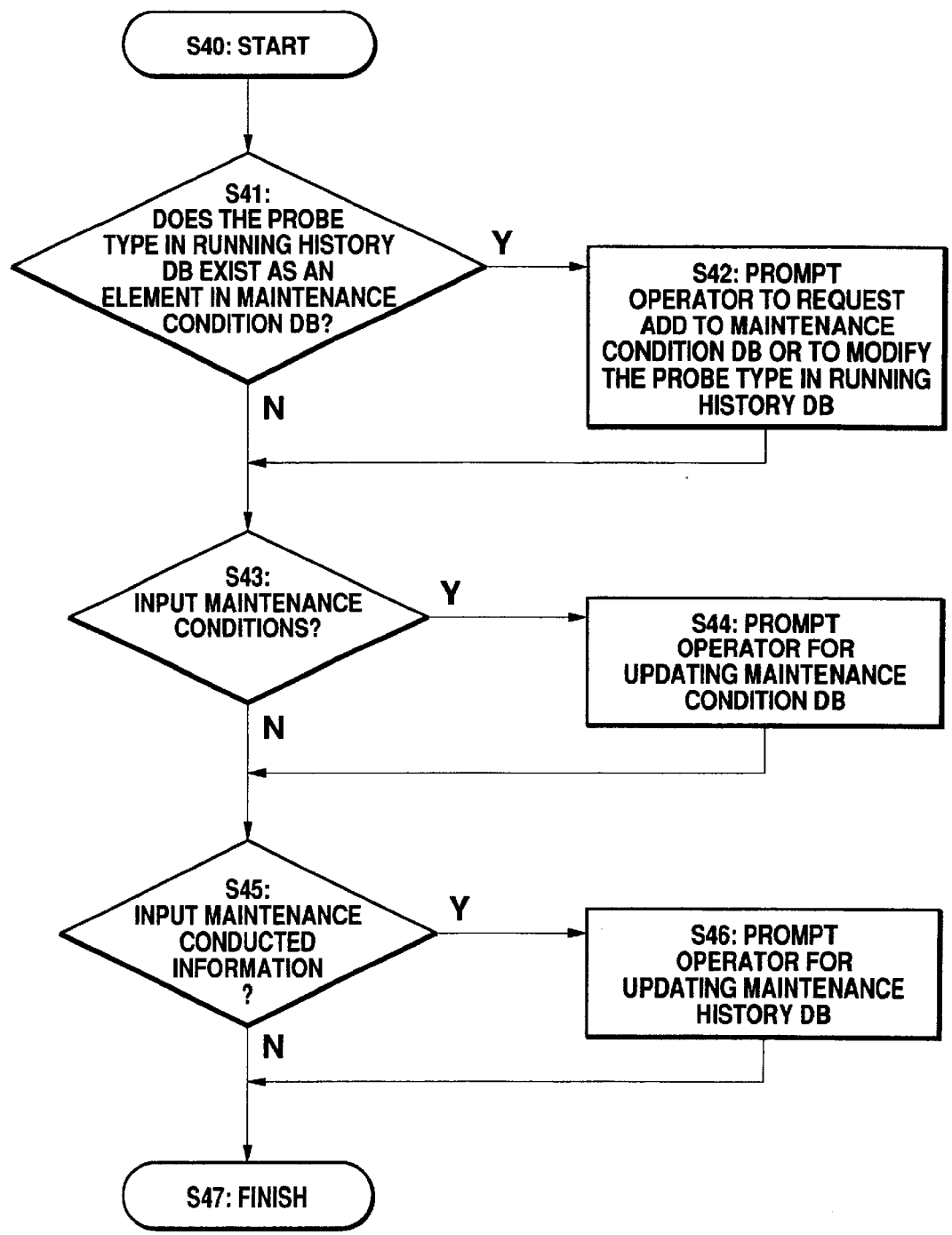
FIG. 14 shows process procedures for a database creating means.

The database creating means 16 is invoked to start processing described in FIG. 14 when either the process of the maintenance information analyzing means 15 is completed, or when manual input of the maintenance conducted information 102 is requested.

The database creating means 16 executes the following process. S40: Process of the database creating means 16 starts. S41: The maintenance condition database 14b is consulted to ascertain whether the probe type in the new record added to the operating history database 14a at the step S11 shown in FIG. 11 exists as an element.

S42: When the probe type does not exist in the maintenance condition database 14b, an operator is prompted to input a maintenance condition of a new probe in the maintenance condition database 14b if the probe is a new type, or to modify the probe type in the operating history database 14a to match the probe type to the element in the maintenance condition database 14b if the probe is not new.

S43: Requests for manual addition or update of the maintenance condition database 14a are checked.

S44: The maintenance condition database 14b is added and updated through an interactive operation with the operator.

S45: Requests for manual addition or update of the maintenance history database 14c are checked.

S46: The maintenance history database 14c is added and updated through interactive operation with the operator regarding maintenance conducted information 102.

S47: Process of the database creating means 16 is terminated.

14. Extracting section of the Latest Maintenance Information

Figure 15:
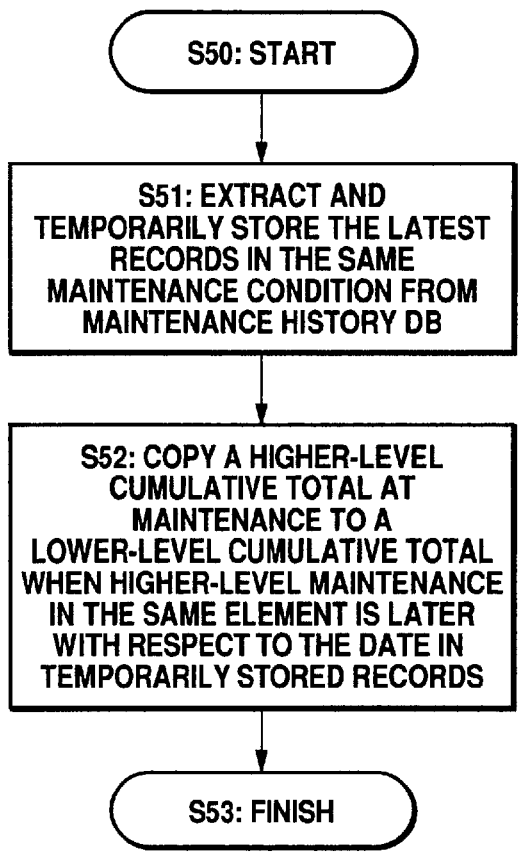
FIG. 15 shows process procedures in a latest maintenance information extracting section.

When creating the maintenance-and-control aid information is indicated as depicted in FIG. 8, the maintenance-and-control aid information creating means 17 is first invoked to execute processing of the extracting section of the latest maintenance information 24 shown in FIG. 15.

The extracting section of the latest maintenance information 24 then executes the following process.

S50: Process of the extracting section of the latest maintenance information 24 starts.

S51: The latest records in the same maintenance condition are extracted from the maintenance history database 14c and stored temporarily. To be more specific, the records of maintenance conducted latest against each element of the measuring device are temporarily stored.

S52: A higher-level cumulative total at maintenance is copied to a lower-level cumulative total at maintenance when higher-level maintenance in the same element is set to later with respect to the date in the records temporarily stored in the previous step.

S53: Process of the extracting section of the latest maintenance information 24 is terminates.

15. Extracting section of Maintenance Notice Information

Figure 16:
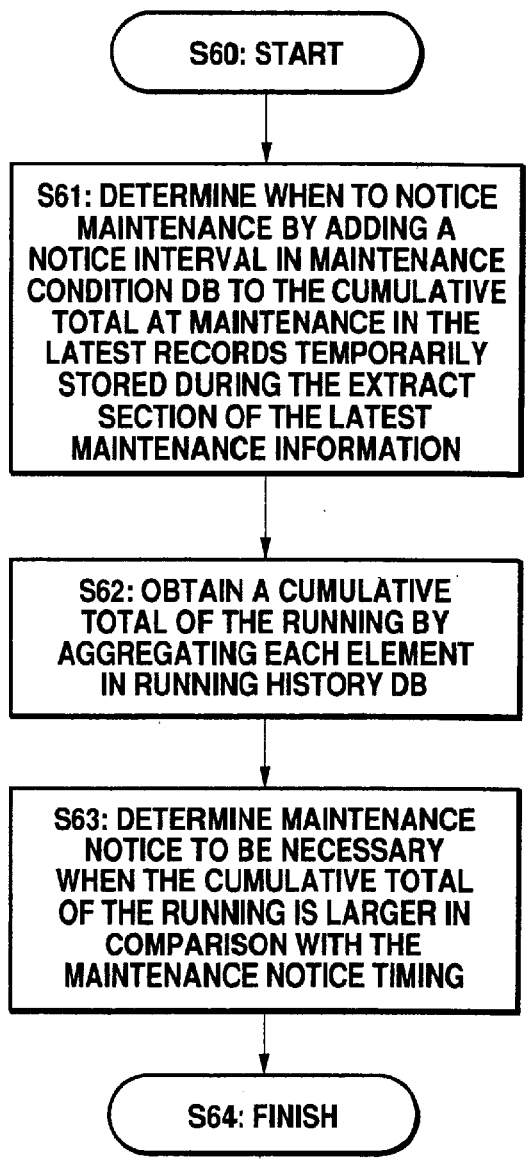
FIG. 16 shows process procedures in a maintenance notice information extracting section.

Subsequently, the extracting section of maintenance notice information 25 is invoked to execute the processing shown in FIG. 16.

The extracting section of maintenance notice information 25 executes the following process.

S60: Process of the extracting section of maintenance notice information 25 starts.

S61: Timing to notice maintenance is determined by adding a notice interval in the maintenance condition database 14a to the cumulative total at maintenance in the latest records temporarily stored in the steps of S51 and S52 depicted in FIG. 15.

S62: The cumulative total of the operating is determined for each of all the records in the operating history database 14a by aggregating data of each element.

63: Maintenance notice is judged to be necessary when the cumulative total of the operating is larger in comparison with the maintenance notice timing.

S64: Process of the extracting section of maintenance notice information 25 is terminated.

16. Extracting Section of Maintenance Timing Information

Figure 17:
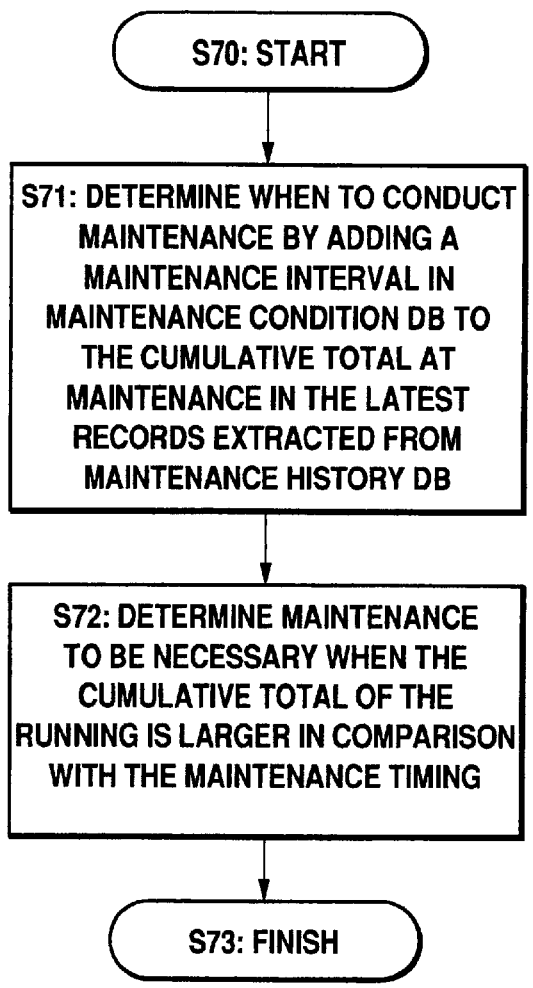
FIG. 17 shows process procedures in a maintenance timing information extracting section.

Next, the extracting section of maintenance timing information 26 is invoked to execute processing shown in FIG. 17.

The extracting section of maintenance timing information 26 executes the following process.

S70: Process of the extracting section of maintenance timing information 26 starts.

S71: Timing to conduct maintenance is obtained by adding a maintenance interval in the maintenance condition database 14b to the cumulative total at maintenance in the latest records temporarily stored in the steps of S51 and S52 depicted in FIG. 15.

S72: Maintenance is judged to be necessary when the cumulative total of the operating obtained in the step S62 of FIG. 16 is larger in comparison with the maintenance timing.

S73: Process of the extracting section of maintenance timing information 26 is terminated.

17. Creating Section of Maintenance-And-Control Aid Information

Figure 18:
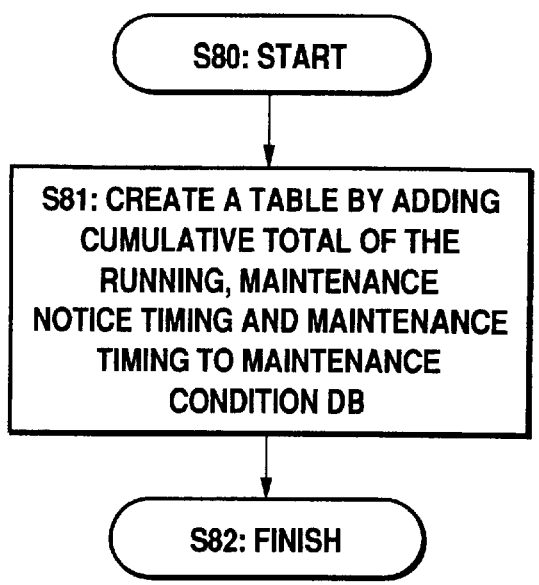
FIG. 18 shows process procedures in a maintenance-and-control aid information compiling section.

And next, the creating section of maintenance-and-control aid information 27 is invoked to execute processing shown in FIG. 18.

The creating section of maintenance-and-control aid information 27 executes following process. S80: Process of the creating section of maintenance-and-control aid information 27 starts.

S81: A table is created by adding the cumulative total of the operating obtained in the step S62, the maintenance notice timing obtained in the step S61, and judgement for maintenance notice decided in the step S63 of FIG. 16, and the maintenance timing obtained in the step S71, the judgement for maintenance decided in the step S72 of FIG. 17 to contents in the maintenance condition database 14b. Printout, display on screen, and file creation are performed.

S82: Process of the creating section of maintenance-and-control aid information 27 is terminated.

18. Other Embodiments

Although the maintenance timing is determined from the cumulative total of operating distance in the embodiment described above, it is also acceptable to determine the maintenance timing through the cumulative total of the product of distance and velocity.

It is also possible to extract and add up maintenance information by inputting control information concerning executing point measuring instructions and axis moving instructions or the like to the maintenance information analyzing means directly from the three-dimensional coordinate measuring device, rather than extracting information by analyzing the part program.

It is also possible to invoke the maintenance-and-control aid information creating means according to an instruction form the measuring device as necessary in addition to manual operation by an operator. For example, setting up the maintenance-and-control aid information creating means to be automatically invoked every time the measuring device is turned on or the part program starts processing, for the purpose of displaying maintenance information before conducting measurement. This enables prevention of accidents caused by forgetting to implement maintenance.

In addition, it is possible to further ease operation through acknowledging the state in which maintenance notice has been issued or maintenance has already been required to the operator by a distinct flasher, lamp, buzzer, or screen display.

It is also possible to display the contents of maintenance-and-control aid information on the measuring device side through feedback to the measuring device and to set interlock on operation of the measuring device as necessary. To achieve this, it is capable of providing a field of an operation stopping interval in the maintenance condition database with processing as in the case of the maintenance notice timing and maintenance timing so as to generate information about timing to stop the operation.

Furthermore, having described the maintenance-and-control aid apparatus as an apparatus or method being independent of the measuring device, the present invention may be incorporated in the control unit of the measuring device. This allows the maintenance-and-control aid information to be generated in real time during processing measurement while enabling downsizing of the machine itself.

What is claimed is:

1. A maintenance-and-control apparatus for coordinate and surface texture measuring device comprising
   a means for analyzing operating status of the measuring device wherein one or both of a part program of measurement and output of a measurement result input, and operating information of the measuring device is extracted, and
   a storage means for storing said operating information.

2. A maintenance-and-control apparatus for coordinate and surface texture measuring device comprising
   a means for analyzing operating status of the measuring device wherein one or both of a part program of measurement or output of a measurement result are input, and operating information by each component of the measuring device is extracted, and
   a storage means for storing said operating information.

3. A maintenance-and-control apparatus for coordinate and surface texture measuring device according to claim 1, further comprising
   a maintenance aid information creating means for generating maintenance-and-control aid information for the measuring device from a history of said operating information stored in said storage means is included.

4. A maintenance-and-control apparatus for coordinate and surface texture measuring device comprising
   a means for analyzing operating status of the measuring device wherein one or both of a part program of measurement or output of a measurement result or both of them are input, and operating information by each component of the measuring device is extracted, and
   a database converting means for converting said operating information by each component to a database for maintenance-and-control aid information for the measuring device.

5. A maintenance-and-control apparatus for coordinate and surface texture measuring device comprising with a maintenance-and-control aid apparatus according to claim 4, wherein the database is a relational database.

6. A coordinate and surface texture measuring device which incorporates a maintenance-and-control apparatus according to claim 1.

7. A maintenance-and-control method of a three-dimensional coordinate and surface texture measuring device comprising the steps of
   analyzing operating status of the measuring device wherein one or both of a part program of measurement or output of a measurement result are input and operating information of the measuring device is extracted,
   and a storage step of storing said operating information.

8. A maintenance-and-control method of a three-dimensional coordinate and surface texture measuring device comprising the steps of
   analyzing operating status of the measuring device wherein one or both of a part program of measurement or output of a measurement result are input and operating information by each component of the measuring device is extracted, and
   a storage step of storing said operation information.

9. A maintenance-and-control method of a three-dimensional coordinate and surface texture measuring device comprising a maintenance-and-control aid method according to claim 7, further comprising a maintenance-and-control aid information creating step of generating maintenance-and-control aid information for the measuring device from a history of said operating information stored in said storage step.

10. A maintenance-and-control method of a coordinate and surface texture measuring device comprising the steps of
    analyzing operating status of a measuring device wherein one or both of a part program of measurement or output of a measurement result are input and measuring machine operating information is extracted for each component, and
    a database converting step of converting said operating information for each component into a database for generating maintenance-and-control aid information for the measuring device.

11. A maintenance-and-control method according to claim 10, wherein the database is a relational database.

12. A three-dimensional coordinate measuring method for measuring coordinate and surface properties including a maintenance-and-control aid method according to claim 7.

13. A media on which is stored a program which causes a computer to execute a three-dimensional coordinate and surface texture measuring device method for extracting maintenance information through analyzing a part program and a storage procedure for rewritably storing said maintenance information.

* * * * *